Sept. 22, 1942.  R. S. BABCOCK ET AL  2,296,376
PROCESS OF AND APPARATUS FOR THERMOCHEMICALLY WORKING FERROUS METAL
Filed July 25, 1939  2 Sheets-Sheet 1
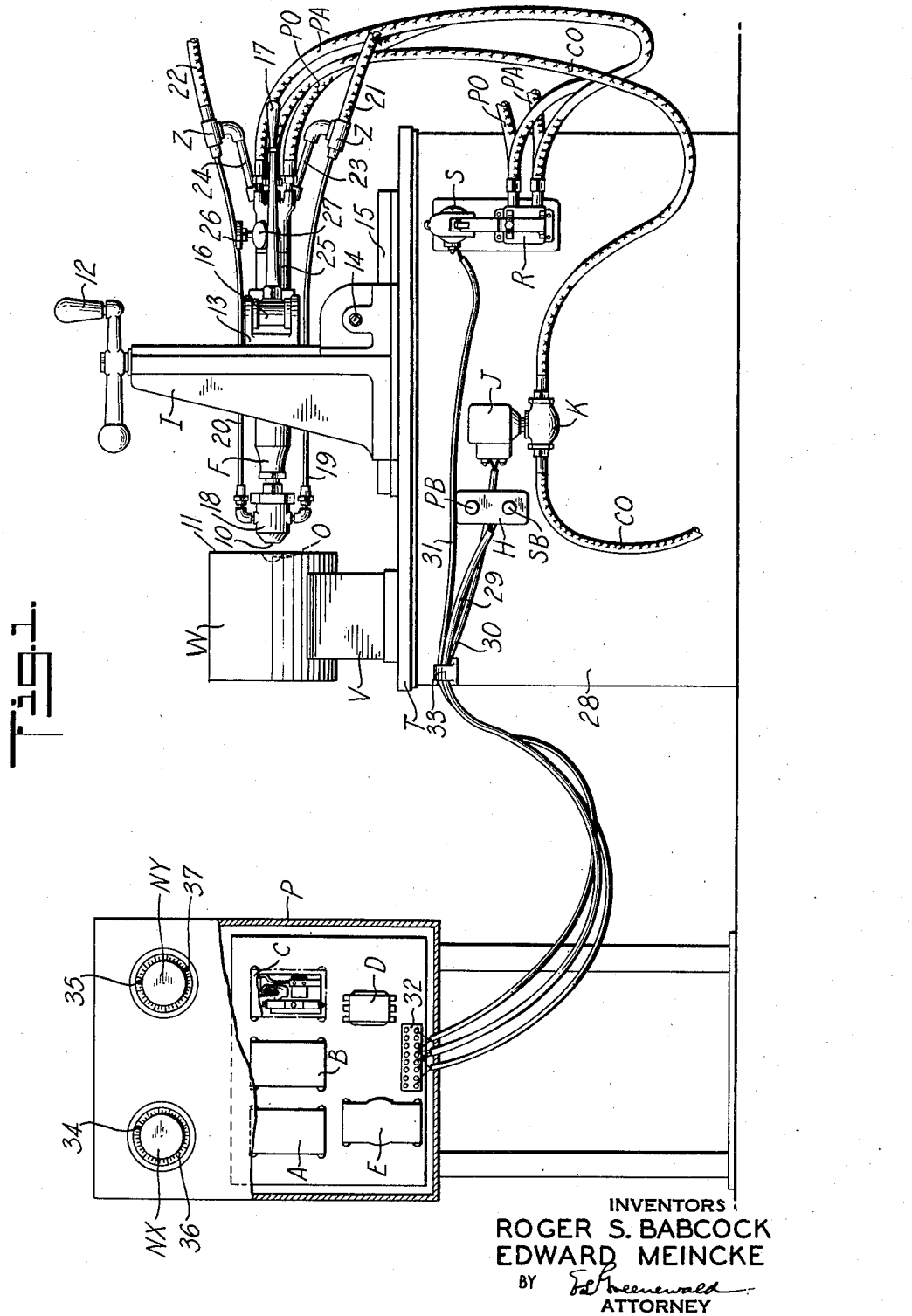
INVENTORS
ROGER S. BABCOCK
EDWARD MEINCKE
BY
ATTORNEY

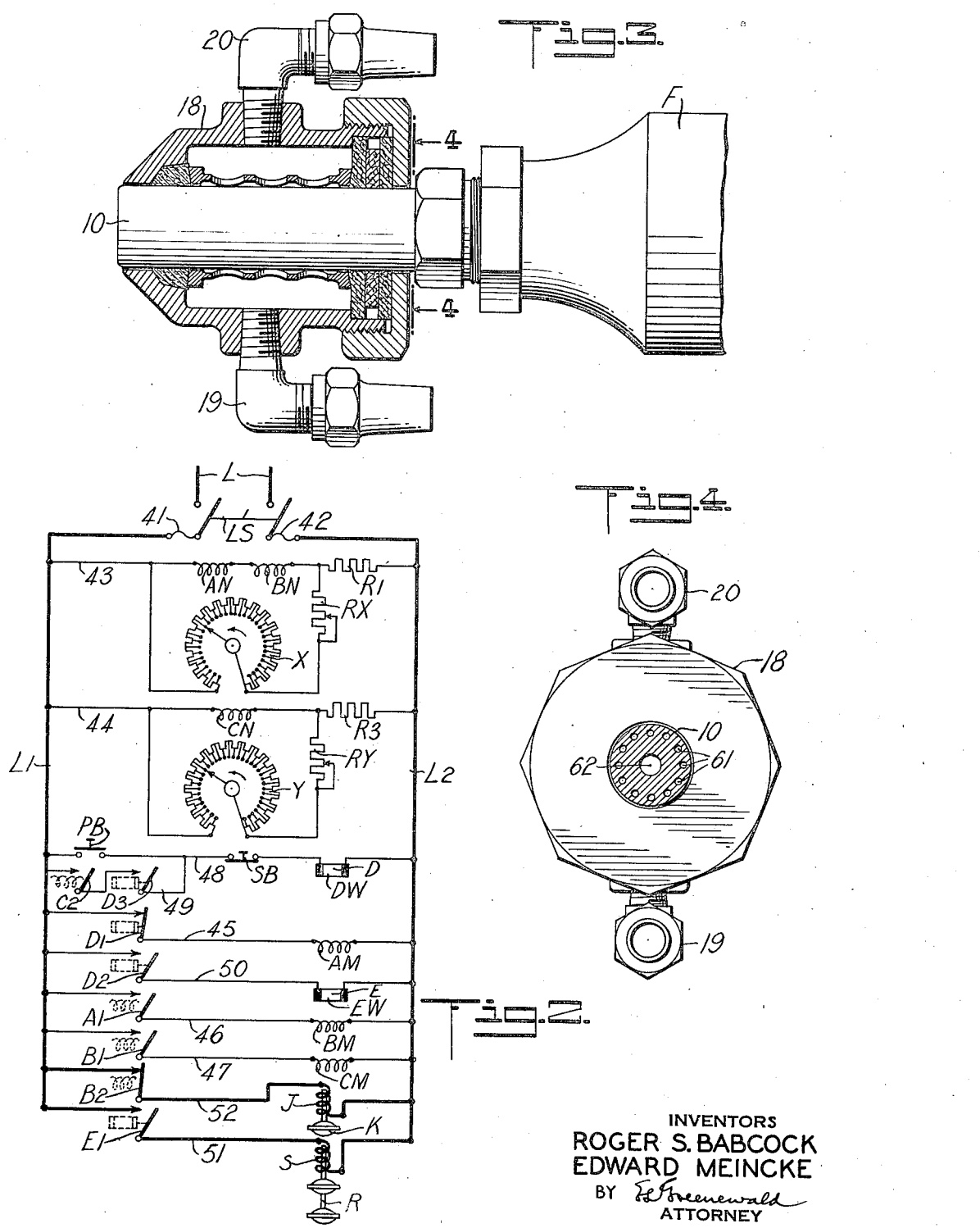

Patented Sept. 22, 1942

2,296,376

UNITED STATES PATENT OFFICE 2,296,376

PROCESS OF AND APPARATUS FOR THERMOCHEMICALLY WORKING FERROUS METAL

Roger S. Babcock, Plainfield, and Edward Meincke, Roselle Park, N. J., assignors to The Linde Air Products Company, a corporation of Ohio Application July 25, 1939, Serial No. 286,362

7 Claims. (Cl. 148—9)

This invention relates to a process of and apparatus for thermochemically working ferrous metal, and more particularly to a new and improved method of and means for preheating and cutting ferrous metal bodies, such as for billet centering, with uniformly accurate and predictable results, as well as to means for controlling such operations.

Billet centering is the art of forming a shallow recess in one end of a billet for the insertion of the end of a mandrel used to pierce the billet which is to be made into seamless tubing by further operations. For billets of three inches in diameter this recess or center is about ¾ inch in diameter and depth, the size of the center increasing up to about 1½ inches for billets of six inches in diameter. It is highly important that the size of the center be as close as possible to a specified depth and diameter, because the resulting tubing will be formed improperly and with difficulty if there is much deviation in the size of the center from that specified.

Heretofore, billet centering has been confined to cold work which first was presented endwise to a cutting blowpipe. An operator through personal observation manually controlled the supply of gases to the blowpipe to first preheat and then flame cut or drill the recess or center in the end of the billet. This resulted not only in a waste of valuable gases but in the formation of centers of non-uniform size. In some cases the billets were spoiled and in any event billet centering generally was time consuming, expensive, unreliable and required expert workmen. It was virtually impossible to center hot billets because of the human element, although this presents the most desirable condition from a cost standpoint by virtue of the savings in preheating and cutting, as well as reheating of the billet for tube forming.

Therefore, the main objects of this invention are to provide: a method of centering billets that is reliable, simple, economical, efficient, and equally applicable to hot and cold work; an automatic timing mechanism for controlling the supply of gases to a blowpipe for preheating and for thermochemical reaction with a ferrous metal body, such as a billet; a thermochemical process the operation of which is entirely automatic after the initiation of a starting step; billet centering apparatus having control means adapted to be pre-set to produce and reproduce a center of specified size; and means which solve the problems and thereby overcome the disadvantages and undesirable features of the prior art.

These objects are attained in part by the use of a novel automatic timer for billet centering operations. Its use controls the diameter and depth of the holes, such as the conical holes referred to as centers, made in the ends of bars being prepared for a piercing operation, as in seamless tube manufacture. Timing adjustments are made by means of adjustable rheostats having a plurality of steps. Timing relays are provided for obtaining a preheat range of from one to twelve seconds, and another timing relay is provided for obtaining a cutting range of from 0.5 to six seconds. After the timing operation has been started by means of a push-button, the timer is entirely automatic and, when the centering cycle has been completed, the timer resets itself, ready for the next operation. The cycle may be stopped at any stage by means of a push-button.

Referring to the drawings:

Fig. 1 is a simplified view, mainly in elevation, of apparatus embodying features of this invention for billet centering;

Fig. 2 is a simplified wiring diagram of the timer and gas control apparatus;

Fig. 3 is an enlarged view partly in longitudinal cross section of the blowpipe; and Fig. 4 is a view partly in elevation and partly in section taken on line 4—4 of Fig. 3.

As shown by the drawings, the apparatus comprises a table T and a control panel P. Mounted on the table T is an upright bracket I supporting a cutting blowpipe F in substantially horizontal position. In this position the tip 10 of the blowpipe F is adapted first to project preheating jets and then a cutting jet against the end face 11 of a billet W temporarily mounted in a trough V located on the table T. By means of a vertical screw terminating in a hand crank 12, and a coacting travelling nut connected to a clamp 13 supporting the blowpipe F, the vertical position of the blowpipe F relative to the end face 11 of the billet W may be accurately adjusted. Longitudinal adjustment of the blowpipe F is obtained by means of a pinion on a shaft 14, which coacts with a rack fixed to a bed 15 of the bracket I. The bed 15 is secured to table T and forms ways on which the lower portion of the bracket I slidingly is secured to provide horizontal adjustment of the bracket I and blowpipe F thereon along the ways. The travelling nut and clamp 13 are connected to each other by a bell crank 16 having a handle 17 by means of which the blowpipe F may be swung into and out of operative position with respect to the work W.

The blowpipe F is supplied with preheating gases, such as oxygen and acetylene, through supply conduits PA and PO from any suitable source. The blowpipe also is supplied with cutting fluid, such as oxygen, through a supply conduit CO. The tip or nozzle 10 of the blowpipe F is exceptionally long and is surrounded by a jacket 18 which is supplied with a cooling fluid, such as water, through an inlet pipe 19 and an outlet pipe 20. These pipes are connected to a cooling water supply by means of conduits 21 and 22 through T fittings Z to which also are connected pipes 23 and 24 for circulating cooling water through a jacket 25 on the body of the blowpipe F. At the same time, water is circulated through the jacket 18 on the tip 10, and backfiring, as well as overheating of the tip 10, thus is inhibited. Needle valves having knobs 26 and 27 are provided for adjusting the flow of preheat acetylene and preheat oxygen, respectively, to the blowpipe F.

The gas supply conduits PO and PA are each provided with a normally-closed valve in a valve unit R controlled by a solenoid S mounted on a panel 28 beside the table T. Likewise mounted on the panel 28 is a solenoid J adapted to control a normally-closed valve K in the cutting oxygen conduit CO. Thus, when the solenoid S is energized, the valve unit R opens the normally-closed valves in the conduits PO and PA so that preheating gases are supplied to the blowpipe F; and when the solenoid J is energized, the valve K opens and cutting oxygen is supplied to the blowpipe F.

A housing H, containing a starting switch PB and a stop switch SB, is mounted on the panel 28. Electrical cables 29, 30 and 31 containing insulated conductors extend between the control panel P and the panel 28; the conductors being connected to suitable terminals on a block 32 mounted on the panel P, and to suitable terminals on the solenoid S, solenoid J, and housing H. A hanger 33 on the panel 28 collectively supports the cables 29, 30 and 31 near the edge of the panel 28.

Mounted on the control panel P are time delay or timing relays A, B and C, a supervisory relay D and a heavy duty relay E. These relays normally are concealed, while exposed for manual adjustment are knobs NX and NY having pointers 34 and 35 back of which are provided fixed annular scales 36 and 37, respectively, calibrated in arbitrary units and fractions thereof. The knob NX is connected to a rheostat X, Fig. 2, for controlling the timing relays A and B; and the knob NY is connected to a rheostat Y for controlling timing relay C, whereby the electrical control system may be pre-set to perform a desired centering operation automatically with accuracy and precision.

Each of the relays A, B and C, is a time limit relay, such as that disclosed in Patent 1,979,709 to Walter Schaelchlin et al., of November 6, 1934, having one or two auxiliary contacts which are normally open or normally closed. The relay has one coil consisting of one magnetizing winding and one neutralizing winding. When the magnetizing winding is open-circuited the magnetic flux decreases, thereby inducing a high current in a copper tube surrounding a core piece. This current opposes any change in the magnetic field, which consequently, decays very slowly. It continues to decay until the force of a kickout spring overcomes the magnetic pull, permitting an armature to release. However, by energizing the neutralizing winding in opposition to the magnetizing winding, the period of decay and drop-out is controllable, being responsive to the current passing through the neutralizing winding. By varying the current in the neutralizing winding, a wide range of time delay can be obtained. It can be varied between ½ second and 10 seconds; however, six seconds are considered maximum for all practical purposes, because the timing becomes somewhat erratic above six seconds.

Referring particularly to Fig. 2, the electrical supervisory control circuit shown, by way of example, comprises a pair of conductors L1 and L2, and a disconnect switch LS for connecting said conductors to a direct current power circuit L having a voltage of about 230 volts, for example; fuses 41 and 42 being provided for safety. The disconnect switch LS should be closed. This results in the energization of neutralizing winding AN, BN and CN of timing relays A, B and C. The timing relays A and B control the preheating period. Two relays are used because the total time required for preheating may be in the range of from 6 to 12 seconds on cold billets. The relays A and B are arranged to act in series to provide a total time range of from 1 to 12 seconds.

The neutralizing windings on coils AN and BN are designed for low voltage operation and therefore are connected in series with a resistor R1 of about 600 ohms resistance by means of a circuit 43 connected across the conductors L1 and L2. In order to control the current in these coils AN and BN, an 80 ohm variable field rheostat X is connected in parallel with the two coils. When this resistance is entirely shunted out, the current in the neutralizing coils AN and BN becomes a minimum value and hence the maximum time delay is obtained. An adjustable resistor RX of about 25 ohms resistance is disposed in series circuit relation with the rheostat X to prevent a direct short across the neutralizing coils AN and BN by reducing the rheostat resistance to zero, in which case there would be no neutralizing effect, and as a result the relays A and B would stay in indefinitely.

The timing relay C which controls the cutting time, is independent of relays A and B; that is to say, the time delay desired of it may be different from that of the preheat relays. Its neutralizing coil CN is, therefore, controlled by a separate variable field rheostat Y. A circuit 44 containing the neutralizing coil CN and a fixed resistor R3 in series, is connected across the conductors L1 and L2. The rheostat Y is connected in parallel with the neutralizing coil CN and contains in series circuit relation therewith an adjustable resistor RY.

The rheostats X and Y are provided with control knobs NX and NY, respectively, as pointed out above, by means of which the rheostats may be set to obtain any desired time limit. At the start of the operating cycle, magnetizing windings or coils AM, BM and CM are energized, because the magnetizing coil AM of timing relay A is connected across the conductors L1 and L2 by a circuit 45 containing normally-closed contact means D1 of the supervisory relay D. This energizes the magnetizing coil AM which closes the normally-open contact means A1 which is connected across the conductors L1 and L2 by a circuit 46 which includes the magnetizing coil BM of timing relay B. This in turn energizes the magnetizing coil BM which closes the normally-open contact means B1 which is connected across the conductors L1 and L2 by a circuit 47 which includes the magnetizing coil CM of timing relay C. Thus, all of the magnetizing coils are energized when the disconnect switch LS is closed.

The coil DW of the supervisory relay D is connected across the conductors L1 and L2 by a circuit 48 which includes the starting switch PB and the stop switch SB. A parallel circuit 49 across the starting switch PB includes, in series, normally-open contact means C2 and D3. The contact means C2, although normally open, is closed by the energization of the magnetizing coil CM when the disconnect switch LS is closed. Thus, when the starting switch PB is momentarily closed, the supervisory relay coil DW is energized causing the normally-open contact means D3 to close, thereby establishing a "holding in" shunt circuit around the starting switch PB. This starts the operating cycle of the apparatus.

The instant that supervisory relay D is energized, its contact means D2 closes to complete the circuit from conductor L1 through a coil EW of a second supervisory heavy duty relay E to conductor L2. For this purpose a circuit 50, including the coil EW and the normally-open contact means D2, in series, is connected across the conductors L1 and L2. When the coil EW is energized it operates to close its normally-open contact means E1 in a circuit 51 connected across the conductors L1 and L2 and including in series the solenoid S, which, upon being energized, opens the coupled valves in the unit R controlling the flow of preheat gases to the blowpipe. At the same time, the contact means D1, which is normally closed, opens to break the circuit 45 including in series the magnetizing coil AM, which starts timing relay A. After the pre-set time for the timing relay A has elapsed, contact means A1 opens, breaking the circuit 46 including the magnetizing coil BM of the timing relay B. This starts timing relay B, and after its time interval has elapsed, the contact means B2 closes, completing the circuit 52 from conductor L1 through contact means B2 to solenoid J controlling the cutting oxygen valve K. This opens the cutting oxygen valve K so that cutting oxygen is supplied to the blowpipe.

When the timing relay B falls out, contact means B1 opens, breaking the circuit 47 containing the magnetizing coil CM of timing relay C and starting the timing of the cutting period. After the pre-set time for timing relay C has elapsed, timing relay C falls out, opening contact means C2 which, in turn, causes the coil DW of relay D to be de-energized, resulting in the opening of contact means D2, thus de-energizing relay coil EW, resulting in the opening of contact means E1, which de-energizes solenoid S thereby closing the valve unit R and shutting off the preheating gases to the blowpipe F. At the same time that relay D falls out at the termination of the cycle, contact means D1 again closes, acting to reset the timing relay A which, in turn, resets timing relay B which, acting through contact means B2, de-energizes solenoid J, thereby shutting off the cutting oxygen; and also resets timing relay C, thereby restoring the controls to an initial condition for a repetition of the cycle.

The cycle may be interrupted at any time by depressing the push button of the normally-closed stop switch SB. This causes the gases to be immediately shut off and resets the controls for another cycle. The adjustable resistors RX and RY may be adjusted to obtain 12 seconds preheating time, and six seconds cutting oxygen time, as follows: the disconnect switch LS is closed, connecting the conductors L1 and L2 to the power line L. Rheostat X is set at its maximum preheating position which is the stop beyond an arbitrary index member, in this case thirty-three, for example. With the rheostat so set, all of the resistance of the rheostat is shorted out. The slide on the resistor RX is then loosened and varied to change the resistance while checking with a stop watch until a time delay of twelve seconds is obtained. Increasing the resistance decreases the delay, and decreasing the resistance increases the delay. Approximately 10 ohms is necessary for a delay of twelve seconds. The adjustable slide should be tightened before a check is made with the stop watch. The delay should not be set for more than twelve seconds, because any setting beyond this time is unreliable. The twelve seconds delay is obtained by timing relays A and B, each delaying approximately six seconds in series to make up the total of twelve seconds. The same procedure should be followed in adjusting the relay RY to obtain a maximum delay of six seconds for the timing relay C which controls the cutting time.

The entire small circular area in the end face of the billet wherein the hole O is to be made must be substantially uniformly preheated before the oxidizing operation is started. The ordinary cutting or deseaming nozzle is provided with four or six and in some cases eight preheating orifices which tend to produce a centering hole having a poor contour, on either hot or cold work. Undesirable grooves are formed in the mouth of the hole and extend inwardly. The reason for this irregular contour is that the metal between two adjacent preheating flames is not uniform in temperature before the cutting operation begins. This is caused by the preheating flames being spaced too far apart to heat the surface uniformly. Therefore, in accordance with this invention, the nozzle tip 10 is provided with a sufficient number of preheating orifices 61 to eliminate such grooves. The use of 12 preheating orifices, each having a diameter of 0.055 inch uniformly spaced to form a circle having a diameter of 0.357 inch, gives satisfactory results with a central cutting oxygen orifice 62 having a diameter of 0.189 inch. An annular preheating orifice would, also, give very good results.

Briefly, the operation of the apparatus is as follows: before making a centering cut, the blowpipe F is adjusted so as to be in the correct cutting position and the two rheostats X and Y on the control panel P are set through the knobs NX and NY, respectively, to the desired preheating and cutting periods. The nozzle 10 and the end face 11 of the billet W, in correct cutting position, preferably are spaced a distance slightly greater than the length of the preheating flames which will issue from the orifices 61, so that stable operation of the blowpipe F will result and the diameter of the center O to be made will be constant for all cuts. This is an important feature, because backfiring is reduced thereby. The proper adjustments of the blowpipe F are made by manipulating the crank 12, and by turning the shaft 14 by means of a wrench or crank, not shown. The needle valves 26 and 27 controlling the flow of gases in the blowpipe also are properly adjusted to obtain the desired preheating and cutting jets. These settings and adjustments will vary for billets of different sizes.

The billet is accurately positioned and the blowpipe F is swung into cutting position and simultaneously the operator presses the starting switch PB which starts the centering operation. The preheating gases automatically are turned on, ignited by any suitable means, and after a predetermined pause for preheating, the cutting oxygen is turned on automatically. After the predetermined cutting period has elapsed, all of the gases are turned off automatically, and the blowpipe is swung out of position and the billet W, provided with a center 0 of the proper dimensions, moves on to be pierced and formed into seamless tubing. Preferably the blowpipe is maintained in fixed relation to the billet during the cutting period, the oxygen jet thus being maintained substantially on the axis of the cavity or center being formed.

It is not necessary to reset the timer unless the size of the billets or the size of the centers is changed. The depth of the cut varies substantially directly with the cutting time when the pressure of the cutting oxygen is held constant. The depth is also directly dependent upon the original temperature of the billet, and the diameter of the center is dependent both upon the diameter of the preheat circle as well as the diameter of the oxidizing gas orifice and is also slightly dependent directly on the preheat flame size. The diameter is, also, slightly increased by an increase of pressure. For a given nozzle the diameter of the cut varies directly with the pressure of the cutting oxygen. The length of time which the gases are left on affects the depth of the recess, but does not materially affect the diameter; while the diameter of the cutting oxygen orifice has direct bearing on the diameter of the recess. Thus, uniformity of contour dimensions is assured by the method and apparatus of the present invention.

In the centering of hot billets, manual operation is impossible because of the short ranges of preheating time and cutting time of 1.2 to 1.4 seconds, and 0.5 to 1.8 seconds, respectively, based on an initial billet temperature of about 2000° F., dependent upon the size of the hole to be made, and because the time for cutting any size of hole is very critical and must be held within very narrow limits. However, the present invention overcomes this difficulty and results in the formation of centering cuts of accurately predetermined dimensions. The timing apparatus functions to accurately control the preheating time and cutting time so that holes of reasonably constant dimensions always are obtained. The automatic timer is necessitated by the fact that to reproduce holes of the same size, the time of the steps of the centering operation must be held within very narrow limits.

The timing principle disclosed herein may be applied to other thermochemical operations, particularly for timing the duration of preheating before the cutting oxygen is turned on, for example, when severing ferrous metal bodies such as billets in which the time delay relay method is also necessary for timing the preheat, and the time of terminating the cutting action is determined by the cut reaching the edge of the body.

Also, if desired, the preheating and cutting cycle may be started automatically rather than manually, when the work is positioned properly, by a trigger adapted to be tripped by the work as it moves into the correct position; the trigger being electrically associated with the starting circuit.

What is claimed is:

1. Apparatus for thermochemically forming a recess in a ferrous metal body, such as a billet, comprising the combination with blowpipe means having preheating jet producing means and oxidizing jet producing means; and conduit means for supplying said blowpipe means with preheating gases, such as oxygen and acetylene, and an oxidizing gas, such as oxygen; of valve means associated with said conduit means for controlling the gas flow therethrough; automatic supervisory control means including an interval timer acting in sequence first to open said valve means controlling the flow of preheating gases to said blowpipe and then, at the end of a predetermined preheating time interval, acting to open said valve means controlling the flow of oxidizing gas to said blowpipe means, and finally, at the end of a predetermined oxidizing time interval, acting to close said valve means controlling the flow of all gases to said blowpipe means; and means for adjusting said interval timer to change said preheating and oxidizing time intervals before the starting of said automatic supervisory control means.

2. Apparatus for thermochemically forming a recess in a ferrous metal body, such as a billet, comprising the combination with a blowpipe having a nozzle provided with separate gas orifice means; gas supply means comprising separate conduit means connected to said blowpipe; normally-closed separate valves for controlling the gas flow through said conduit means; and an electrical control circuit including an interval timer for opening said valves in sequence for predetermined intervals of time.

3. Apparatus for thermochemically centering ferrous metal bodies, such as billets, comprising the combination with a blowpipe having a central orifice adapted to project a jet of oxidizing gas against the end of a billet to be centered, said blowpipe having orifice means surrounding said central orifice and adapted to project annular preheating flame means against such end; and an oxidizing gas supply conduit and preheating gas supply conduits connected to said blowpipe; of normally-closed valves in said gas supply conduits; means automatically responsive to a starting operation for opening the valves controlling the flow of preheating gases to said blowpipe, whereby said preheating flames are projected against such end of a billet to provide a preheated area; means including an interval timer, operative upon the opening of said preheating gas control valves, for holding said last-named valves open for a predetermined time interval; means acting to open the valve controlling the flow of oxidizing gas to said blowpipe at the end of a predetermined preheating time interval, whereby said oxidizing gas jet is projected against the center of the preheated area of such end of the billet; and means including an interval timer, operative upon the opening of said oxidizing gas control valve, for holding said last-named valve open for a predetermined oxidizing time interval during which the billet centering is completed by thermochemical reaction.

4. Process of centering a furnace-heated, hot ferrous metal body, such as a billet, comprising the steps of positioning in alignment with an end face of such billet a cutting blowpipe provided with a central cutting gas orifice surrounded by preheating gas orifice means; supplying said preheating gas orifice means with preheating gas; igniting the preheating gas by said hot body to provide a preheating flame which acts to raise a zone of the metal to a kindling temperature; simultaneously with the supply of preheating gas initiating the operation of an interval timer; at the end of a predetermined preheating time interval automatically supplying said cutting gas orifice with oxygen for thermochemical reaction with said metal in said zone; and continuing the supply of oxygen to said orifice for a predetermined cutting time interval while maintaining said blowpipe in fixed relation to said billet.

5. Process of centering a ferrous metal body, such as a billet, comprising the steps of positioning, in spaced relation to a face of a billet, a cutting blowpipe nozzle; supplying said blowpipe with preheating gas; igniting the preheating gas and directing the resulting flame against said billet; simultaneously with the supply of preheating gas starting the operation of an interval timer; at the end of an accurately predetermined preheating time interval during which the metal is raised to a kindling temperature, supplying said blowpipe with oxidizing gas and directing the latter against said billet for thermochemical reaction with said metal; and continuing the supply of preheating gas and oxidizing gas until the end of an accurately predetermined cutting time interval during which the operation is completed.

6. Process of centering a ferrous metal body, such as a billet, for subsequent formation into seamless tubing, comprising the steps of positioning, in alignment with an end face of a billet, a cutting blowpipe nozzle provided with a central cutting gas orifice surrounded by preheating gas orifice means; supplying said preheating gas orifice means with preheating gas; igniting the gas issuing from said preheating gas orifice means, so that preheating flames are directed toward an annular zone on such end face of the billet; at the end of a predetermined preheating time interval during which the metal within said zone is raised to a kindling temperature, supplying said cutting gas orifice with oxidizing gas for thermochemical reaction with said metal within said zone; and continuing the supply of oxidizing gas to said orifice while maintaining said billet and said nozzle in fixed relation to one another until the end of a predetermined cutting time interval during which the centering operation is completed.

7. Process of forming a recess of predetermined dimensions in a ferrous metal body which comprises applying a source of heat to a localized surface area of said body to preheat a portion of said body to its kindling temperature; simultaneously with the application of said source of heat initiating the operation of an interval timer; at the end of a first predetermined interval of time after initiation of said preheating step, automatically initiating the flow of a stream of oxidizing gas under pressure against said surface area to form such recess; and at the end of a second predetermined interval of time after initiation of such preheating step during which such stream of oxidizing gas is maintained on the axis of such recess, automatically stopping the flow of such stream of oxidizing gas against said body; the lengths of said first and second intervals of time, and the pressure of such oxidizing gas being so correlated with one another that a recess of the desired size and shape is formed.

ROGER S. BABCOCK.
EDWARD MEINCKE.